(12) United States Patent
Mostoufi et al.

(10) Patent No.: US 9,286,937 B2
(45) Date of Patent: Mar. 15, 2016

(54) METHOD AND APPARATUS FOR DYNAMIC MEDIA STREAMING

(75) Inventors: Ali Mostoufi, San Francisco, CA (US);
Samuel Sutch, San Francisco, CA (US);
Pamela Kramer, San Mateo, CA (US)

(73) Assignee: mitú Inc., Culver City, CA (US)

( * ) Notice: Subject to any disclaimer, the term of this patent is extended or adjusted under 35 U.S.C. 154(b) by 0 days.

(21) Appl. No.: 13/591,353

(22) Filed: Aug. 22, 2012

(65) Prior Publication Data
US 2014/0056574 A1 Feb. 27, 2014

(51) Int. Cl.
| H04N 5/76 | (2006.01) |
| G11B 27/02 | (2006.01) |
| G11B 27/031 | (2006.01) |
| G11B 27/32 | (2006.01) |
| H04N 21/262 | (2011.01) |
| H04N 21/2743 | (2011.01) |
| H04N 21/4223 | (2011.01) |
| H04N 21/4788 | (2011.01) |
| H04N 21/854 | (2011.01) |

(52) U.S. Cl.
CPC ............. *G11B 27/02* (2013.01); *G11B 27/031* (2013.01); *G11B 27/322* (2013.01); *H04N 21/26258* (2013.01); *H04N 21/2743* (2013.01); *H04N 21/4223* (2013.01); *H04N 21/4788* (2013.01); *H04N 21/854* (2013.01)

(58) Field of Classification Search
CPC .. G11B 27/034; G11B 27/02; G11B 2220/90; G11B 27/34; G11B 27/105; H04N 9/8042; H04N 21/4223; H04N 21/4788; H04N 21/854
USPC ......................................................... 386/278
See application file for complete search history.

(56) References Cited

U.S. PATENT DOCUMENTS

| 2010/0241755 | A1* | 9/2010 | Bassett et al. ................ 709/229 |
| 2011/0217021 | A1* | 9/2011 | Dubin et al. ................. 386/278 |
| 2012/0075412 | A1* | 3/2012 | Miyamoto et al. ............. 348/36 |
| 2012/0159326 | A1* | 6/2012 | Mital et al. .................... 715/716 |
| 2012/0284343 | A1* | 11/2012 | Lee et al. ...................... 709/206 |
| 2013/0013601 | A1* | 1/2013 | Kabiljo et al. ................ 707/737 |

\* cited by examiner

*Primary Examiner* — William Tran
(74) *Attorney, Agent, or Firm* — Wilmer Cutler Pickering Hale and Dorr LLP

(57) ABSTRACT

The invention can be a computerized method for creating a composite media program. The method can include receiving from a first user over a network at least a first media segment, wherein the first media segment includes a first plurality of media frames. The method can also include receiving from a second user over the network at least a second media segment, wherein the second media segment includes a second plurality of media frames. Finally, the method includes automatically combining at least the first media segment and the second media segment into the composite media program including a series of media segments, wherein the composite media program is available for viewing by at least a set of members of a social network.

6 Claims, 11 Drawing Sheets

METHOD AND APPARATUS FOR DYNAMIC MEDIA STREAMING

FIELD OF THE INVENTION

This invention relates generally to the field of computerized user groups, social networks and dynamic media streaming.

BACKGROUND

There are a variety of types of online user groups and social networks in existence today. Users are able to follow members of their social networks and can view pictures, videos, and share information. Typically, users can share pictures or videos by capturing the pictures/videos and then uploading them manually to the online social network. Members of the social network can then view the pictures/videos.

Social networks typically do not include any automated ways of uploading pictures/videos. In addition, once pictures/videos are uploaded, there is no way of automatically combining these pictures/videos.

A need, therefore, exists for a more flexible method and apparatus for media sharing.

SUMMARY OF INVENTION

According to one embodiment, the invention is a computerized method for creating a composite media program. The method can include receiving from a first user over a network at least a first media segment, wherein the first media segment includes a first plurality of media frames. The method can also include receiving from a second user over the network at least a second media segment, wherein the second media segment includes a second plurality of media frames. Finally, the method includes automatically combining at least the first media segment and the second media segment into the composite media program including a series of media segments, wherein the composite media program is available for viewing by at least a set of members of a user group. The method can be performed in a server that is connected through a network to a plurality of user devices. The media segment can be, for example, a video clip that includes a series of images (which can be media frames). The media segment could also include sound. This method allows the members of the social network to follow the users in an automated manner. The user group can be any group of users that have common interests, common demographics, a common location, or other common characteristics. The user group can also be a social network. Such a social network can have privacy protections to allow users to keep information, including media segments, restricted to only certain users. In other embodiments, the invention can be a computer readable medium that contains instructions that, when executed, perform the steps set forth above.

Another embodiment of the invention is also a computerized method for creating a composite media program. In this embodiment, the invention includes receiving from a user over a network at least a first media segment, wherein the first media segment includes a first plurality of media frames. The invention also includes receiving from the user over the network at least a second media segment, wherein the second media segment includes a second plurality of media frames. The first media segment and the second media segment are automatically combined into the composite media program, wherein the composite media program includes a series of media segments. The method also includes making the composite media program available for viewing only by a set of members of a user group that includes the user. In other embodiments, the invention can be a computer readable medium that contains instructions that, when executed, perform the steps set forth above.

Yet another embodiment is a computerized method for creating a media segment in a mobile device. This method includes capturing a plurality of media frames with the mobile device and automatically combining the plurality of media frames into the media segment, where each segment includes a plurality of frames. The media segment is then stored in storage located on the mobile device. The media segment can then be automatically transmitted to a network server, wherein a user of the mobile device can override the transmission if not desired. The user can, for example, override the transmission by deleting the media segment prior to transmission. In other embodiments, the invention can be a computer readable medium that contains instructions that, when executed, perform the steps set forth above.

BRIEF DESCRIPTION OF THE DRAWINGS

The invention is illustrated in the figures of the accompanying drawings which are meant to be exemplary and not limiting, in which like references are intended to refer to like or corresponding part, and in which.

DETAILED DESCRIPTION

To address the need set forth above, according to one aspect, the invention includes a communications network interface, such as a web server, for interacting with a plurality of users for implementing the functionality of some embodiments of the invention.

Figure 1:
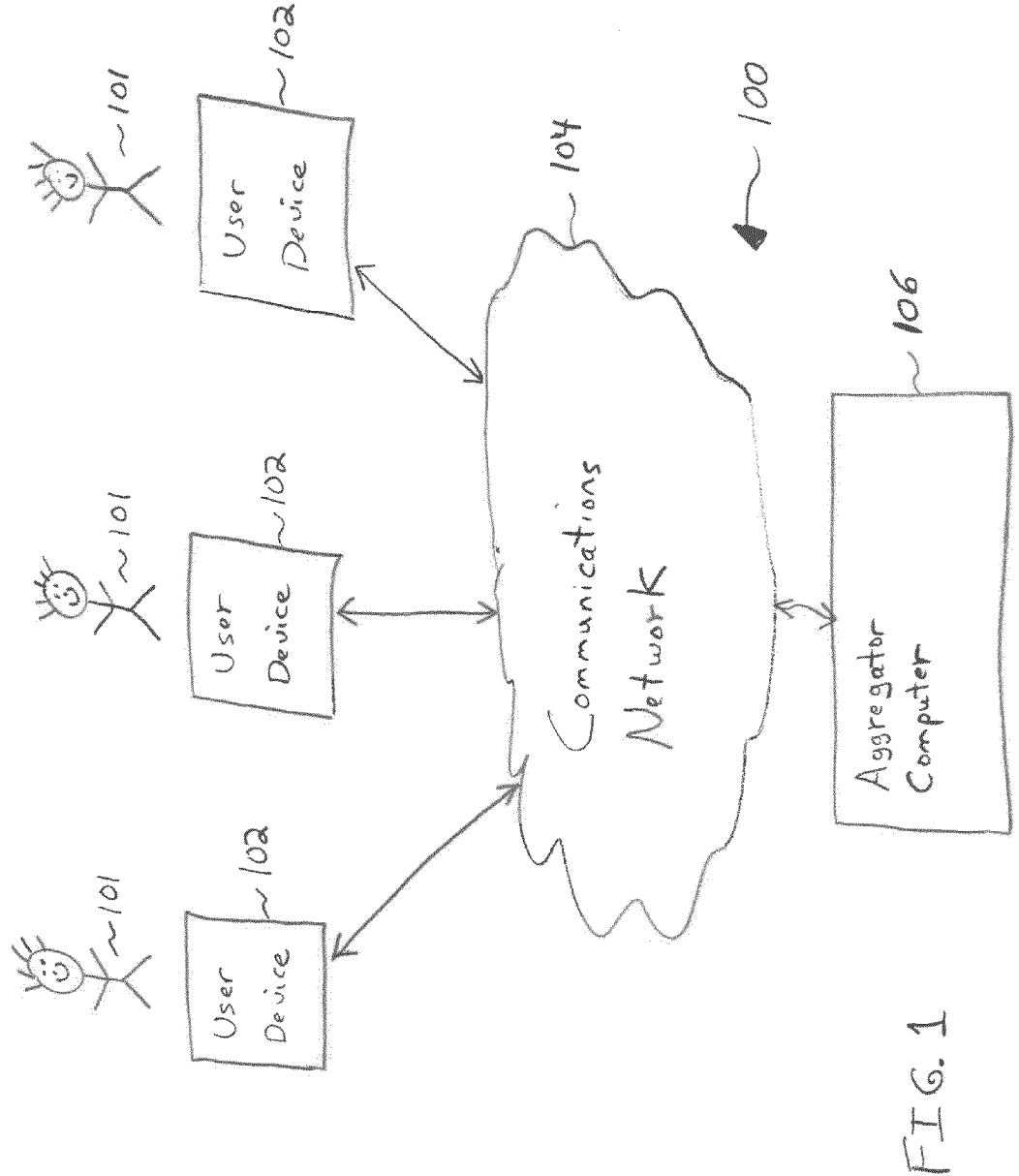
FIG. 1 is a block diagram of a system according to a preferred embodiment of the disclosed subject matter.

More specifically, as can be seen in FIG. 1, the system 100 of the instant invention includes user computers 102 associated with users 101, a communications network 104, and an aggregator computer 106 (also called a server). As one skilled in the art will appreciate, user computers 102 can be any type of computing device, such as a desktop, a laptop, a PDA, a smartphone, a computer tablet, a networked computer display, or any other electronic device capable of connecting to the communications network 104 and receiving data from the network 104 to enable system interaction with the user 101. During operation, the aggregator computer 106 receives media segments from one or more of the user computers 102. The aggregator computer 106 then automatically combines the media segments in an integrated manner into a composite media program and then makes the composite media program available for viewing by at least some of the users 101. The system 100 can be used to create real-time motion visuals for sharing moments in life. The term "media" is used in a broad sense to refer to any type of data including graphics, images, and audio and/or video. The media segment can be, for example, a video clip, with sound, that includes a series of images (which can be media frames). The composite media program, in turn, can be any type of combination of media segments. Such a composite media program can be, for example, a video that consists of a series of media segments that can be played back in succession.

As previously mentioned, the user computers 102 are connected to the aggregator computer 106 via communications network 104, which may be a single communications network or comprised of several different communications networks. As such, communications network 104 can be a public or private network, which can be any combination of the internet and intranet systems, that allow a plurality of system users to access the computer 106. For example, communications network 104 can connect all of the system components using the internet, a local area network ("LAN"), e.g., Ethernet or WI-FI, or wide area network ("WAN"), e.g., LAN to LAN via internet tunneling, or a combination thereof, and using electrical cable e.g., HomePNA or power line communication, optical fiber, and radio waves, e.g., wireless LAN, to transmit data. As one skilled in the art will appreciate, in some embodiments, user computers 102 may be networked together using a LAN for a university, home, apartment building, etc., but may be connected to the aggregator computer 104 via an internet tunneling to implement a WAN. In other instances, all of the user computers 102 and the aggregator computer 106 may connect using the internet. Still in other implementations, a user may connect to the aggregator using, e.g., wireless LAN and the internet. Moreover, the term "communications network" is not limited to a single communications network system, but may also refer to separate, individual communications networks used to connect the user computers 102 to aggregator computer 106. Accordingly, though each of the user computers 102 and aggregator computer 106 are depicted as connected to a single communications network, such as the internet, an implementation of the communications network 104 using a combination of communications networks is within the scope of the invention.

As one skilled in the art will appreciate, the communications network may interface with the aggregator computer 106 to provide a secure access point for users 101 and to prevent users 101 from accessing the various protected databases in the system. In some embodiments, a firewall may be used, and it may be a network layer firewall, i.e., packet filters, application level firewalls, or proxy servers. In other words, in some embodiments, a packet filter firewall can be used to block traffic from particular source IP addresses, source ports, destination IP addresses or ports, or destination services like www or FTP, though a packet filter in this instance would most likely block certain source IP addresses. In other embodiments, an application layer firewall may be used to intercept all packets traveling to or from the system, and may be used to prevent certain users, i.e., users restricted or blocked from system access, from accessing the system. Still, in other embodiments, a proxy server may act as a firewall by responding to some input packets and blocking other packets.

Figure 2:
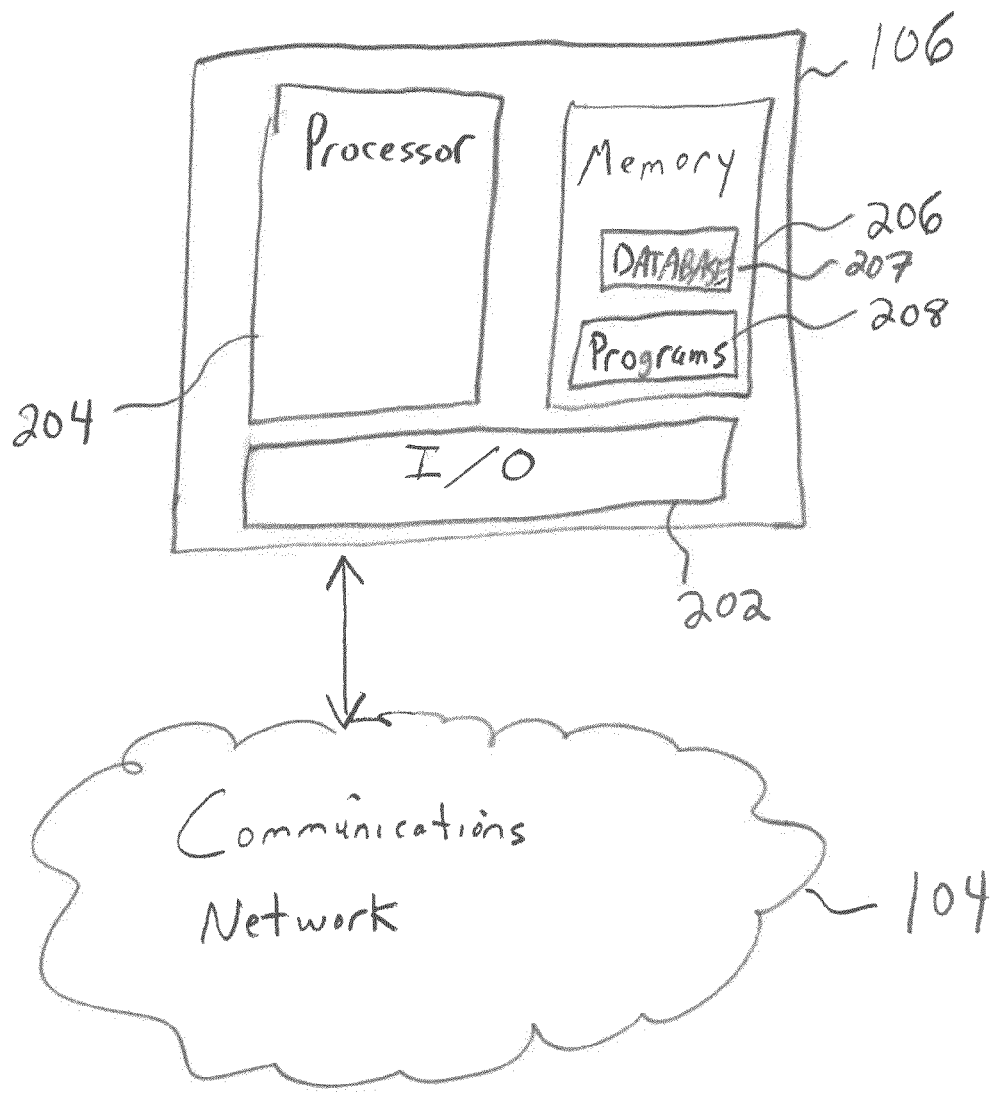
FIG. 2 is a block diagram of a server or aggregator computer that can be used, in part, to carry out the invention in the system of FIG. 1.

An aggregator computer 106 will now be described with reference to FIG. 2. As one skilled in the art will appreciate, aggregator computer 106 can be any type of computer, e.g., an application server, or a plurality of computers, comprising a memory 206, a database 207, a program product 208, a processor 204 and an input/output device ("I/O device") 202. I/O device 202 connects the aggregator computer 106 to a signal from the communications network 104, and can be any I/O device including, but not limited to a network card/controller connected by a PCI bus to the motherboard, or hardware built into the motherboard to connect the aggregator computer 106 to various file servers or database servers implementing database 108.

As can be seen, the I/O device 202 is connected to the processor 204. Processor 204 is the "brains" of the aggregator computer 106, and as such executes program product 208 and works in conjunction with the I/O device 202 to direct data to memory 206 and to send data from memory 206 to the various file servers and communications network, including the database 207. Processor 204 can be, e.g., any commercially available processor, or plurality of processors, adapted for use in an aggregator computer 106, e.g., Intel® Xeon® multicore processors, Intel® micro-architecture Nehalem, AMD Opteron™ multicore processors, etc. As one skilled in the art will appreciate, processor 204 may also include components that allow the aggregator computer 106 to be connected to a display [not shown] and keyboard that would allow, for example, an administrative user direct access to the processor 204 and memory 206.

Memory 206 may be any computer readable medium that can store the algorithms forming the computer instructions of the instant invention and data, and such memory 206 may consist of both non-volatile memory, e.g., hard disks, flash memory, optical disks, and the like, and volatile memory, e.g., SRAM, DRAM, SDRAM, etc., as required by embodiments of the instant invention. As one skilled in the art will appreciate, though memory 206 is depicted on, e.g., the motherboard, of the aggregator computer 106, memory 206 may also be a separate component or device, e.g., FLASH memory or other storage, connected to the aggregator computer 106. The database 207 can operate on the memory to store media segments and combined media segments in the manner described herein.

Figure 3:
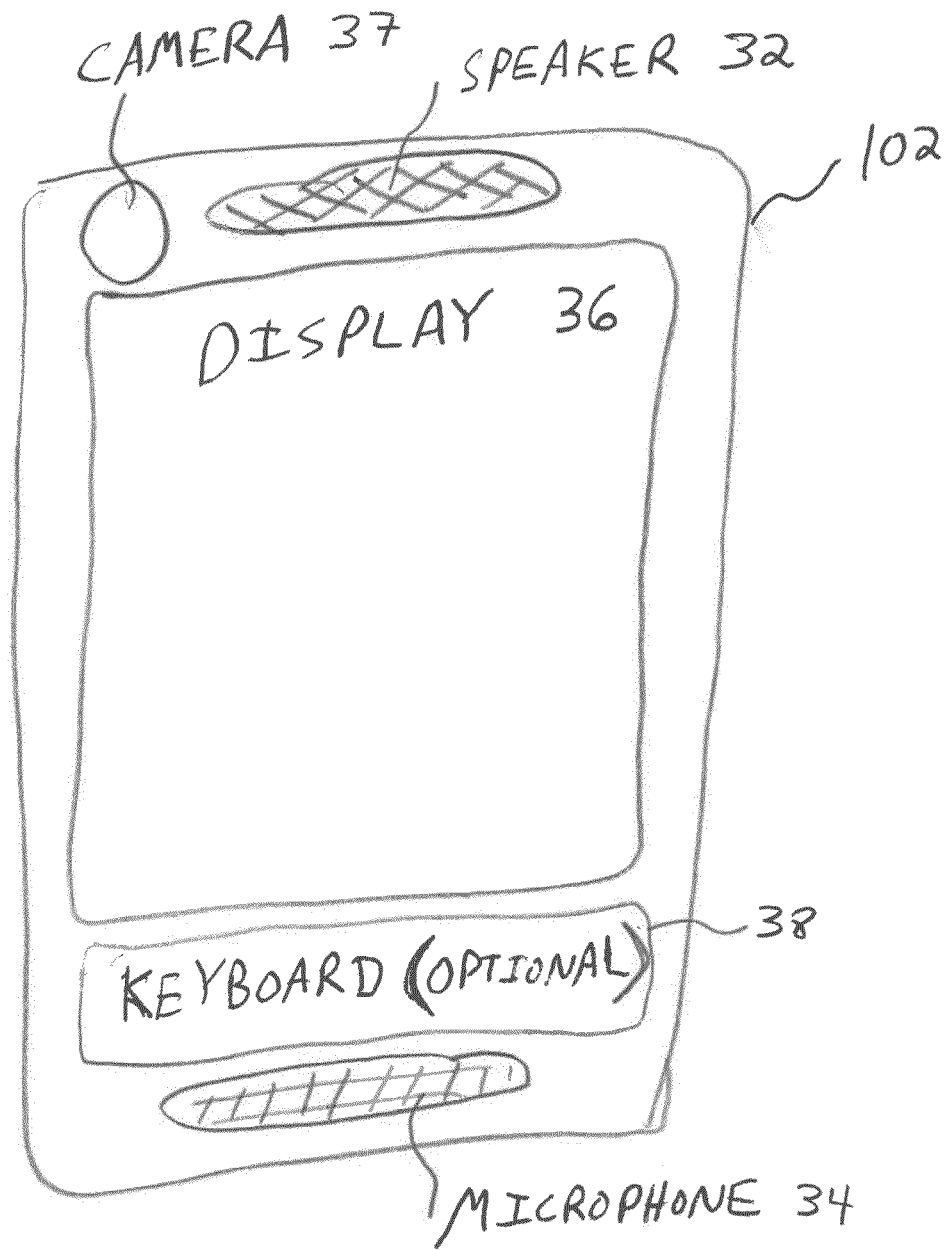
FIG. 3 is a block diagram of a user device that can be used, in part, to carry out the invention in the system of FIG. 1.

FIG. 3 shows a user device 102 that can be used, in part, to carry out the invention described above. The device 102 can be used for all of the user devices described above in connection with FIG. 1. In one embodiment, the device 102 is a tablet computer, which can be a wireless device. In another embodiment, the device 102 can be wireless mobile device such as a smart phone. If used, the smart phone can be any type of smart phone known in the art, including, for example, an iPhone, an Android smart phone, or a Windows-based smart phone. In addition, the tablet can be any type of tablet known in the art, including, for example, an iPad or an Android tablet. Further, the user device 102 can be an iPod Touch or other type of wireless mobile device.

Referring again to FIG. 3, the device 102 can include, for example, a speaker 32, a microphone 34, a display 36, a camera 37, and a keyboard 38. In some embodiments, a touch screen device may be used such that the device 102 does not include a traditional keyboard 38. The speaker 32 and microphone 34 can be optional devices that need not be used. The speaker 32 may be the same speaker used by the device 102 for other functions, such as for a telephone speaker or a speaker for music or other audio features. In addition, the microphone 34 may be the same microphone used by the device 102 for other functions, such as for telephone calls.

The display 36 and keyboard 38 can be the same structures used for other functions. The camera 37 can be the standard camera contained by the device 102. Such a camera 37 can be used, for instance, to capture still shots or video clips as described herein. Accordingly, the invention does not require any special-purpose hardware, but can instead be used with the hardware that is available on most smart phones or tablets.

Figure 4:
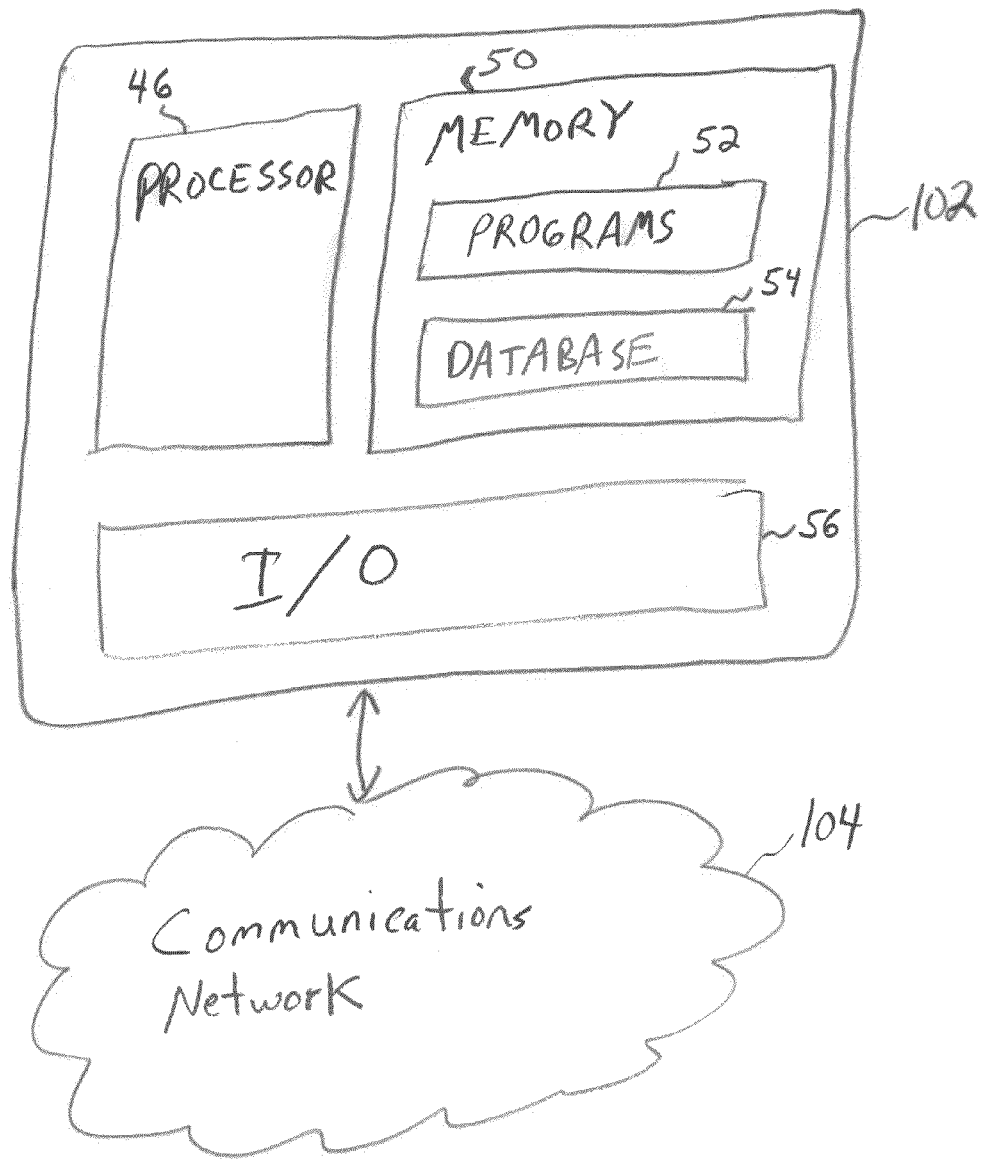
FIG. 4 is a block diagram showing greater detail of the user device of FIG. 3.

FIG. 4 is a block diagram of the internal components of the device 102 of FIG. 3. FIG. 4 shows that the device 102 includes a processor 46, memory 50, and I/O structure 56. The processor 46 can be any processor known in the art for use in computing devices. In one embodiment, where device 102 is a mobile device, the processor 46 can be a low power mobile processor, such as, but not limited to, an ARM processor.

The memory 50 can be any standard memory device (a computer readable medium), such as NAND or NOR flash memory or any other type of memory device known in the art. The memory 50 stores instruction programs 52. These instruction programs 52 can be the code that performs the functions described above and below for the user device 102. During operation, the instructions can be executed by the processor 46 in order to perform the functions described herein. The database 54 can be used to store media frames and media segments captured on the device 102, as described in greater detail below. The I/O device 56 can be used to input or output data to the device 102, such as by wireless transmitting data (either by cellular or by Wi-Fi or other methods) to the network 104.

In operation, the code for performing the functions of the device 102 can be loaded onto the device 102. The code to perform these functions can be stored, either before or after being loaded on device 102, on a computer readable medium. When loaded onto a device 102 and executed, the code can perform the logic described above and in the sections below.

Figure 5:
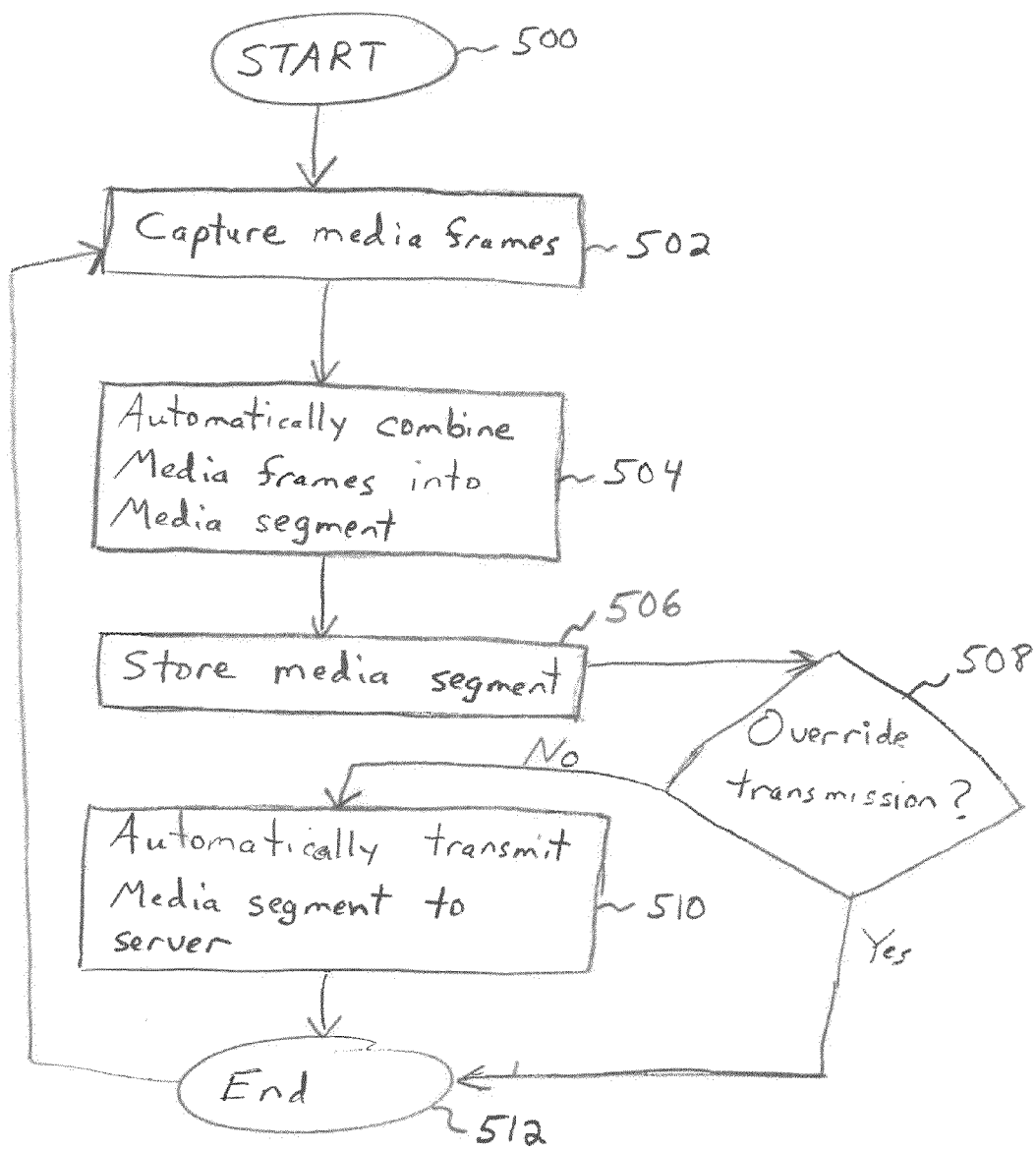
FIG. 5 is a flow chart that sets forth a set of steps that can be used to carry out some aspects of the invention.
Figure 6:
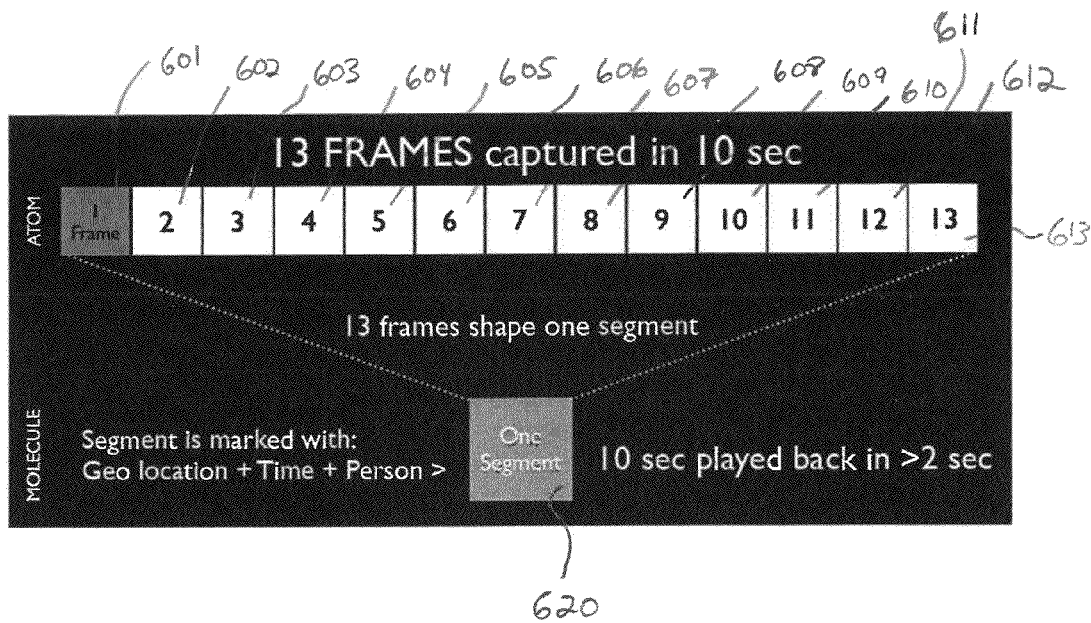
FIG. 6 is a block diagram depicting the content of a media frame and a media segment in one embodiment.

FIG. 5 is a flow chart that sets forth a more detailed set of steps that can be used to carry out some aspects of the invention. More particularly, FIG. 5 sets forth a set of acts that can be performed by the user device 102. Upon starting in block 500, the user device can be used to capture a plurality of media frames, as shown in block 502. These media frames can be automatically combined into a media segment, as shown by block 504. FIG. 6 depicts one way in which media frames can be combined into a media segment, and this can be done within the user device 102. The media segment can then be stored locally on the user device 102, as shown in block 506. Next, in block 508, the user can be given the opportunity to override transmission of the media segment to the network 104. If the user decides not to override the transmission, the media segment is automatically transmitted to the server 106 over the network 104, as shown in block 510. This ends the flow, as shown in block 512. If, at block 508, the user decides to override the transmission, the media segment will not be transmitted to the server 106, and the sequence ends (block 512). The sequence of FIG. 5 can be repeated any number of times as desired, as indicated by the loop-back from the end block 512 to block 502.

The media segments can be bundled as compressed packets for efficient transport to the server 106, particularly where the user device is a wireless device that transmits data wirelessly to the network. This allows for efficient transmission over a range of connectivity (i.e., from 3G to WiFi). In addition, in some embodiments, the user device 102 will user power saving methods to conserve power for the transmission of one or more media segments to the server 106. If, for instance, a wireless quality level is low for a wireless network, continually trying to transmit the one or more media segments to the network can wear down the battery of the user's device. The user's device can, therefore, be programmed to determine a quality level of a connection of the mobile device to a network, and then perform the step of automatically transmitting only when the quality level is above a predetermined threshold.

FIG. 6 is a diagram depicting the content of a media frame and a media segment in one embodiment. More specifically, FIG. 6 shows 13 media frames 601-613 assembled into a single segment 620. The term "atom" is also used to refer to a media frame 601-613, and the term "molecule" is also used to refer to a media segment 620.

As an example, the user can capture a series of visual images/media frames with the camera of the user device 102. In this example, each visual image, or photograph, can be considered a media frame. The user device 102 can combine these media frames into one media segment. In FIG. 6, for example, 13 media frames 601-613 are assembled into a single media segment 620. The number of frames 601-613 that make up a segment 620 can vary within the scope of the invention.

During the capture process, time information and/or location information and/or person information and/or subject matter information (i.e., tag information) can be captured and associated with one or more media segments. For instance, each segment can be marked with the time at which the images were captured. This allows each media segment 620 to have a time associated with it, and after transmission to the server, this time information can be used to assemble media segments captured within the same general time period. Further, the location information that can be appended to each segment 620 can be, for example, geo location information, such as GPS information or other information about the location of the user device 102 at the time of capture. The person information can be the identity of the user of the user device 102. The location information and the person information, like the time information, can be used by the server to assemble media segments for playback. For instance, the server can assemble the media segments with the same location information for playback, and the server can also assemble media segments from the same user for playback. Finally, the subject matter information can include a descriptor from the user relating to the media segment, such as food, poker, fishing, a child, etc. . . . This can allow the server to assemble media segments that have the same subject matter into a composite media program.

FIG. 6 shows an example in which the 13 media frames 601-613 are captured in about 10 seconds. In this example, during the playback process (described below), after these media frames 601-613 are assembled into a media segment 620, the media segment 620 can be played back in approximately two seconds. This capture duration allows a user to easily capture a series of images over an extended period of time, and the playback duration is short enough to quickly play back these images to tell a story.

Figure 7:
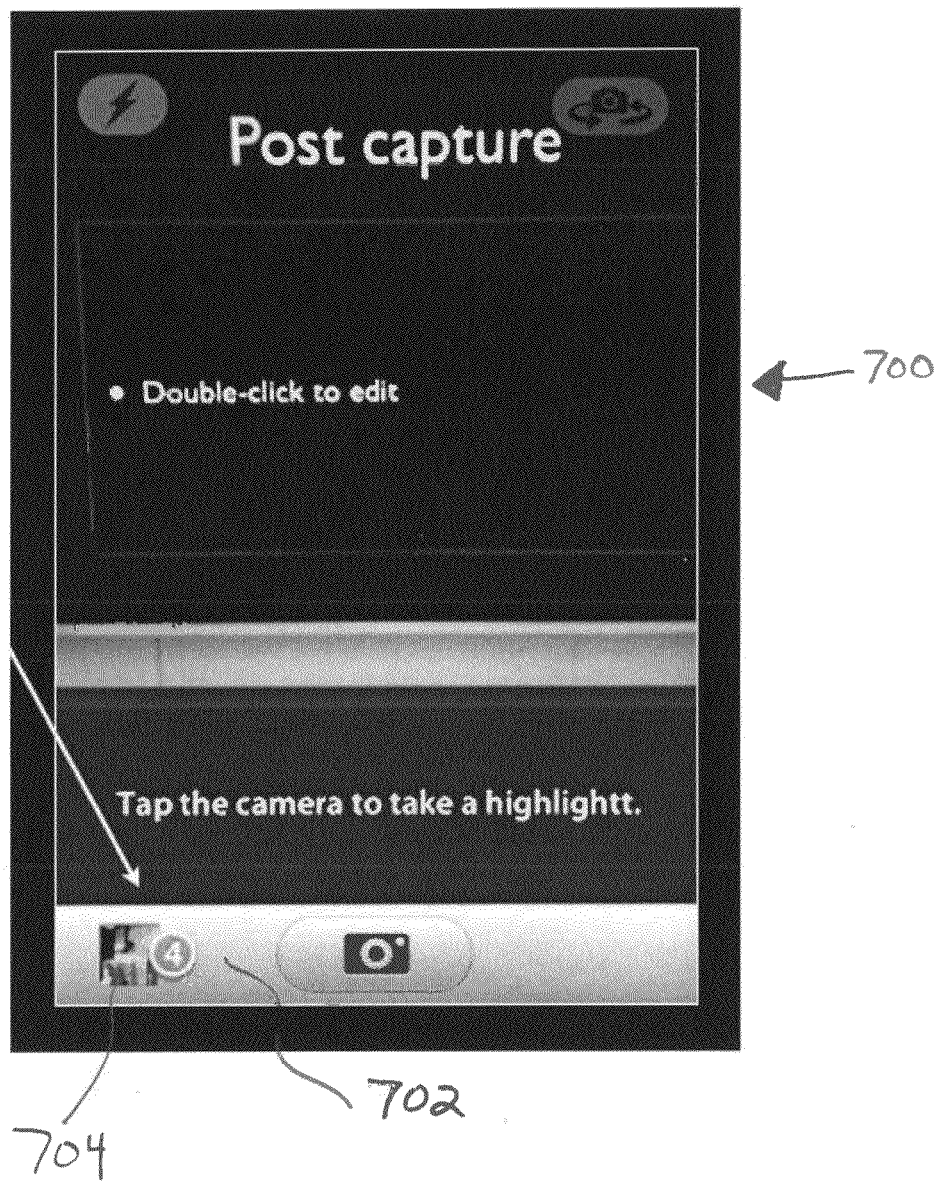
FIG. 7 is a diagram of a screen shot/graphical user interface of a user device that can be used to edit a media segment after the capture process.

FIG. 7 is a diagram of a screen shot/graphical user interface 700 of a user device 102 that can be used to edit a media segment after the capture process. Referring again to FIG. 6, step 508 allows the user to override the transmission of the media segment to the server. In FIG. 7, an edit bar 702 can allow the user to select a media segment. One media segment 704 is shown in FIG. 7, but the edit bar 702 can contain multiple media segments. After selection by the user, the user can edit the media segment by, for example, deleting certain frames of the segment or by deleting the segment entirely. For example, if the user edits the plurality of media frames by removing frames, this can reduce a length of the media segment. If deleted entirely, a media segment will not be transmitted to the server. The user can delete a media segment simply by clicking a delete button on a mobile device, for example. This allows the user to have the chance to review and/or replay captured segments prior to upload.

In addition, a graphical user interface can be presented that allows the user to postpone transmission to the server for some period of time, such as 1, 10, or 24 hours. In typical operation, the user device 102 will transmit a media segment after some set period of time, such as 15 minutes. In other words, the user device 102 will be programmed to automatically upload the media segments to the server as a background service that is invisible (entirely or largely) to the user. During this time window, the user can override this transmission by selecting the segment and either deleting it or changing its time for transmission (changing a transmission time can give the user additional time to decide, for example, to delete the media segment). In still other embodiments, a user can set editing rules. These editing rules can allow for the user device to automatically combine the media frames using the predetermined editing rules. For example, the user can set the editing rules so that no more than 5 or 10 frames are assembled into a media segment, so that no sound is assembled into the media segment, or so that all media segments are assembled in black and white only.

In another embodiment of FIG. 7, all media segments are saved on the user device 102 locally. The edit bar 702 can show the number of media segments that are available for viewing. For instance, FIG. 7 shows that there are four media segments available for viewing. Upon clicking the media segments 704 tab, the user interface can display each of the available media segments. The user can then select and edit them as described above.

In another embodiment of FIG. 7, the user interface can provide a tag information window (not shown) to allow a user to enter tagged information for a media segment. For instance, a user can tag a media segment as relating to baseball, poker, a child, or another topic. The user interface can also provide choices for common topics to allow users to easily tag media segments as relating to particular topics.

Figure 8:
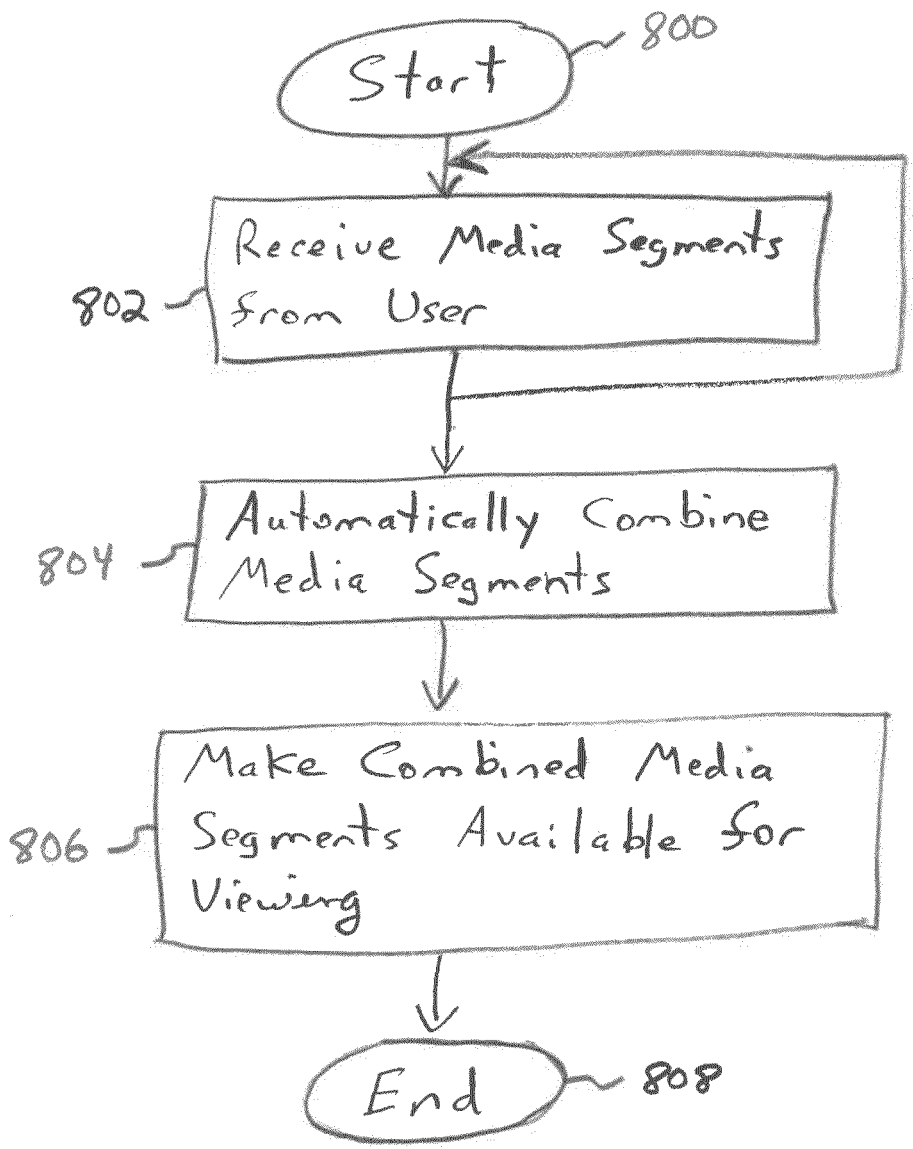
FIG. 8 is a flow chart that sets forth a set of steps that can be used to carry out a second embodiment of the invention.

FIG. 8 is a flow chart that sets forth a more detailed set of steps that can be used by the aggregator computer 106 or server to carry out some aspects of the invention. Upon starting in block 800, the aggregator computer 106 can receive media segments from a user, as shown in block 802. Block 802 can involve receiving media segments from a single user or from any number of users. The step of receiving media segments can be repeated multiple times for each user. In block 804, the aggregator computer 106 automatically combines media segments. For example, the aggregator computer 106 can combine the media segments for a single user (based, for example, on the person information associated with the media segments) or the aggregator computer 106 can combined media segments for multiple users. For example, the aggregator computer 106 can combine media segments based on location information, as will be described below in greater detail, and the aggregator computer 106 can also combine media segments based on time information, subject matter information, or based on social network. The combined segments can be referred to as "series." For example, segments from one or more users can be automatically combined in a sequential manner to be displayed serially.

Next, in block 806, the aggregator computer 106 makes the combined media segments available for viewing. For example, in one embodiment, the aggregator computer 106 can make the combined media segments—also called composite media programs—available for viewing by any user. In other embodiments, the aggregator computer 106 can make the composite media programs available for viewing only by members of a particular user group. Such a user group can be, for example, a particular social network. The phrase social network is used in much of the description below, but this description also applies to a user group, where a user group can have broader applicability than a social network. This can keep the user's media segments somewhat private in that the public at large will not be able to view the composite media programs in this embodiment. The process ends at block 808.

Within the embodiments described above, media segments can be combined at the server level for easy viewing by users. This combining of media segments can be done on-the-fly or in advance. For instance, on-the-fly combinations can be performed when a user wishes to view media segments through the system. If the user selects a topic, location, time, or user group, the server can combine the media segments on-the-fly and present them to the user. In addition, the combination of media segments can be performed in advance of a request for viewing by a particular user.

In some embodiments, the server can combine media segments along with other types of media segments that are not captured by users of the system. For instance, the media segments captured by users can be combined with media from sources such as the Internet. As one specific example, if a users tag media segments as relating to a home run by the San Francisco Giants, these tagged media segments can be combined along with other media relating to home runs by the San Francisco Giants that is available on the Internet.

Figure 9:
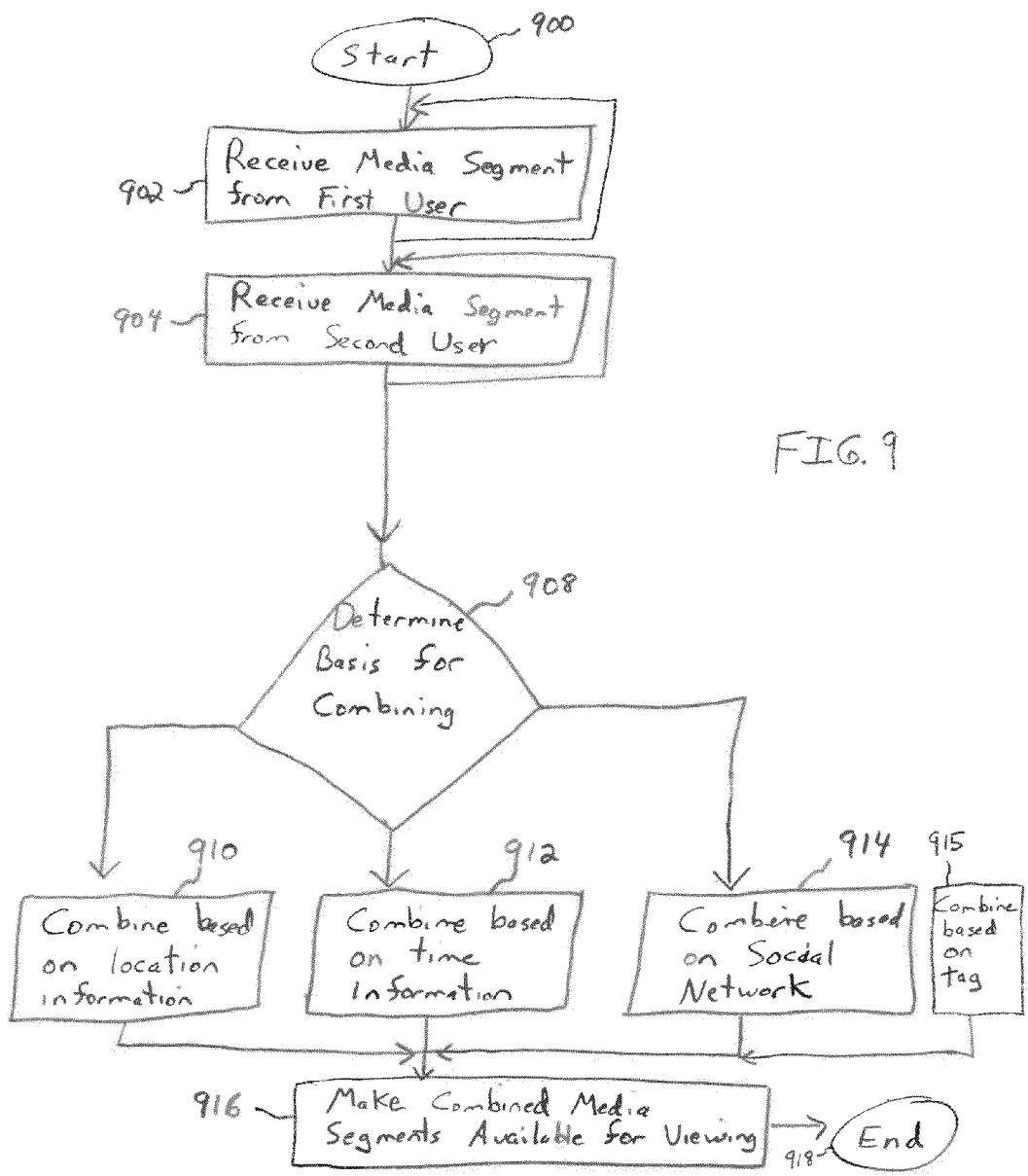
FIG. 9 is a flow chart that sets forth a set of steps that can be used to carry out a third embodiment of the invention.

FIG. 9 is another flow chart that sets forth a detailed set of steps that can be used by the aggregator computer 106 or server to carry out some aspects of the invention in another embodiment. Upon starting in block 900, the aggregator computer 106 can receive one or more media segments from a first user, as shown in block 902. This step can be repeated any number of times. Next, in step 904, the aggregator computer 106 can receive one or more media segments from a second user. This step can also be repeated any number of times. After receiving these media segments, the aggregator computer 106 can determine a basis for combining the media segments, as shown at step 908. The aggregator computer 106 can make this determination based on a request for playback by a user of the system, based on predetermined time intervals, or can be set up to determine how to combine the media segments automatically. FIG. 9 depicts four ways in which the combinations of media segments into composite media programs can be made.

Figure 11:
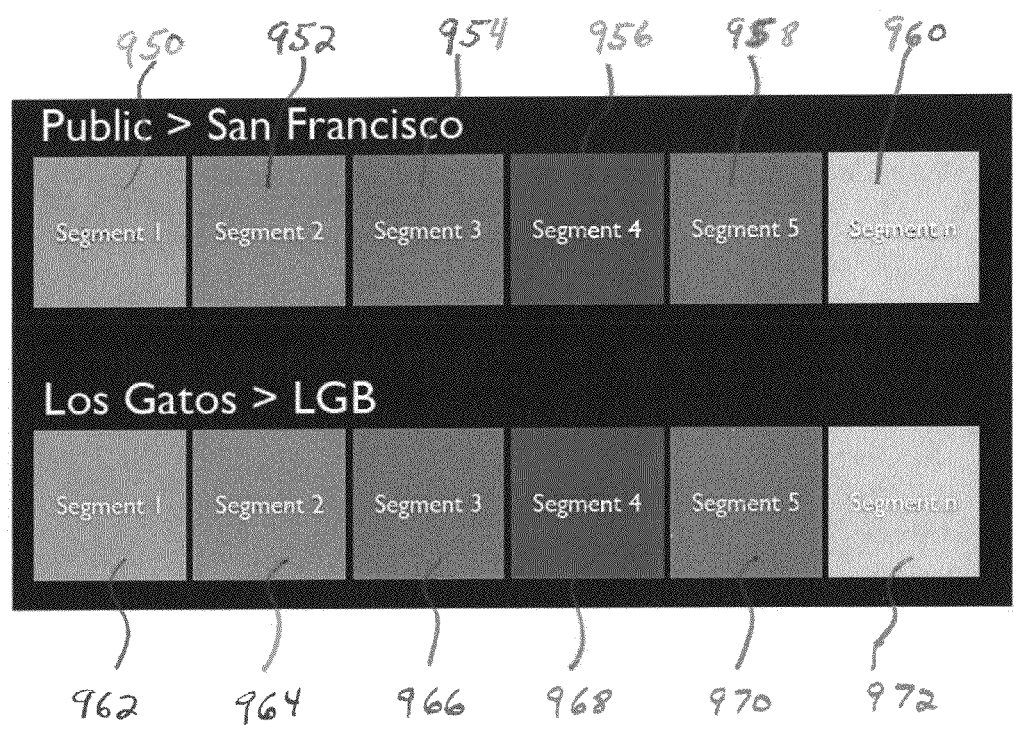
FIG. 11 depicts media segments combined into a composite media program based on location of capture.

First, as shown in block 910, media segments can be combined into composite media programs based on location information. For example, if the media segment(s) for the first user and the media segments(s) for the second user (and for additional users if more are present) were captured in the same location, the media segments can be combined based on location to create a composite media program that includes the media segments from the same location. In this example, for instance, media segments from the first and second users can be combined only if they were tagged as being captured in the same location. FIG. 11, for example, shows that media segments 950-960 have been combined into a composite media program because these media segments 950-960 were all captured in San Francisco. Similarly, FIG. 11 shows that media segments 962-972 have been combined into a composite media program because these media segments were all captured in Los Gatos, Calif. As previously described, the location information can be included in each media segment at the time of capture based on, for example, GPS information or other location providing services. In block 910, therefore, a composite media segment can be created based on that location information associated with media segments from more than one user.

Second, as shown in block 912 of FIG. 9, media segments can be combined into composite media programs based on time information. For example, if the media segment(s) for the first user and the media segments(s) for the second user (and for additional users if more are present) were captured at the same general time, the media segments can be combined based on time to create a composite media program that includes the media segments from the same general time. In this example, for instance, media segments from the first and second users can be combined only if they were tagged as being captured at generally the same time or within the same period of time. The aggregator computer 106 can combine into a composite media program, for example, all media segments received within a one hour time window (i.e., 3-4 pm PT on June 12). Other time periods (i.e., part of a day, a full day, or a week) can also be used.

Third, as shown in block 914 of FIG. 9, media segments can be combined into composite media programs based on social network. For example, if the first user and the second user (and additional users if more are present) are part of the same social network, then media segments from these users can be combined to form a composite media program. In this example, for instance, media segments from the first and second users can be combined only if the two users are part of the same social network. For example, if the first user and second user are part of the same social network, then media segments for these two users can be combined and assembled based on capture time into a composite media program. Participants in the social network can then view this composite media program to learn what members of their social network have done.

Fourth, as shown in block 915 of FIG. 9, media segments can be combined into composite media programs based on tag information. For example, if the first user and the second user (and additional users if more are present) each tag one of their media segments as relating to a specific topic (i.e., food, poker, fishing, a child, the World Series, etc. . . . ), then media segments having these tags can be combined to form a composite media program. In this example, for instance, media segments from the first and second users can be combined only if two media segments have the same tag information. For example, if the first user and second user each tag individual media segments as relating to fishing, these media segments for these two users can be combined and assembled into a composite media program. Users can then view these composite media programs based on the tagged topic. This allows a user to view what is going on for a particular topic.

The examples set forth above combine media segments only if a certain criteria is met (i.e., time, location, social network, or tag information). In some embodiments, a subset or all of these criteria can be used to combine media segments. For instance, media segments can be combined based on location information and tag information, such that media segments from the same location and having the same tag information will be combined. In addition, time and/or social network can be factored into the decision as to whether to combine media segments. Any combination of the criteria (i.e., time, location, social network, or tag information) can be used to combine media segments.

Figure 10:
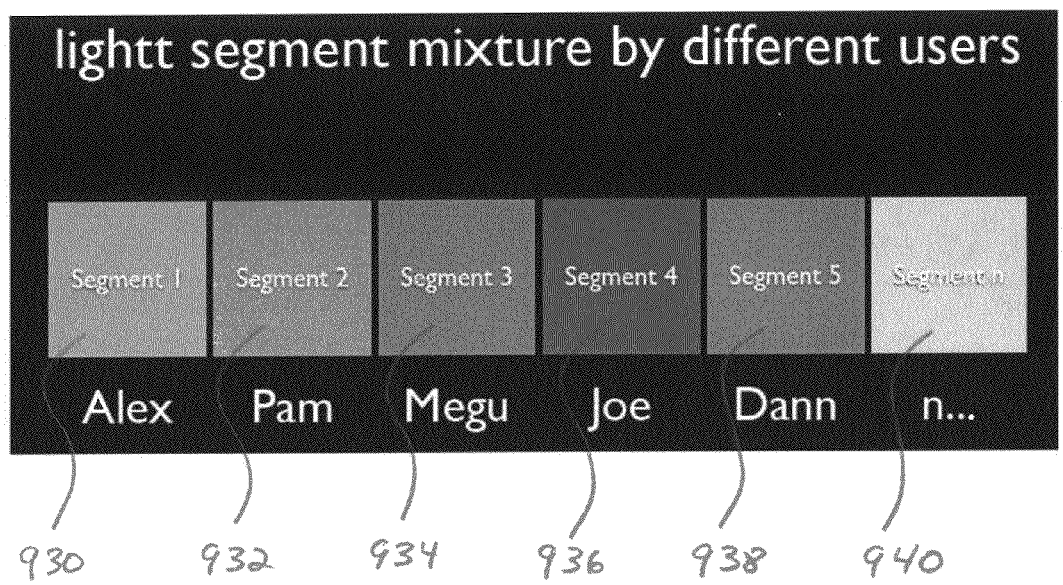
FIG. 10 depicts a composite media program assembled for a plurality of different users based on social network.

FIG. 10 depicts a composite media program assembled for a plurality of different users based on social network. In FIG. 10, for example, media segment 930 is associated with user "Alex," media segment 932 is associated with user "Pam," media segment 934 is associated with user "Megu," media segment 936 is associated with user "Joe," media segment 938 is associated with user "Dann," and media segment 940 is associated with an nth user. As such, at least n media segments can be combined to form the composite media program in this embodiment. Further, in this embodiment, users Alex, Pam, Megu, Joe, Dann, and the nth user are all part of the same social network. In this embodiment, the aggregator computer 106 can determine to assemble the media segments received from these users because they are all part of the same social network. Users of the social network can, therefore, review the composite media program to learn about activities of participants in the social network.

More than one of the bases for forming combinations described above in connection with steps 910, 912, and 914 of FIG. 9 can be used in forming a composite media program. For instance, media segments from the users of a given social network and captured within the same day can be combined to form a composite media segment. In addition, media segments from the users of a given social network and captured within the same day in the same location can be combined to form a composite media segment. As such, any combination of the basis for combining media segments can be used to form the composite media program.

After media segments are combined in the manner set forth above, the aggregator computer 106 can make the composite media program available for viewing. This is shown in block 916 of FIG. 9. For instance, the composite media program can be crafted in a manner so that it can be made available to any number of viewers over a cellular, wireless, or landline connection. The flow of FIG. 9 then ends, as shown in block 918.

Several additional features can be used in the methods and system described above. For example, the aggregator computer 106 can unpack and display media segments are based on user selected visibility/privacy settings. For example, if the user who captured a media segment desires that the media segment only be available to a small or selected set of other users, the user can select those users prior to upload to the server 106. For example, a graphical user interface can be displayed to the user to allow the user to select other users who can see the media segment. In addition, if no such selections are made by the user, the media segment can, in one embodiment, be viewed by any user or the public at large after upload. In still other embodiments, after upload to the server 106, users are always able to go back and remove individual media segments so that they will no longer be visible to others. For example, if a first user captured a media segment and uploaded it to the server, that user would be able to go back later and delete the media segment so that other users could not view it.

In some embodiments of the invention set forth above, upon making the composite media programs available for viewing, the composite media programs can be distributed from the server 106 to other user devices via the Web. In some embodiments, as described above in connection with FIG. 6, about 13 media frames can be captured in about 10 seconds and formed into one media segment. During playback from the server 106, this media segment, when combined into a composite media program, can be arranged into a stream that is viewable at a much faster speed that it case captured (i.e., captured in 10 sec, played back in <2 sec).

As described above, users can decide to mark each media segment as either private or public (via, for example, a graphical user interface at the user device). If marked as public, any user can view that media segment when compiled into a composite media program and made available for viewing at the server 106. If marked as private, in one embodiment, no other user aside from the user who captured the media segment can view it during playback from the server 106. In still other embodiments, when marked as private, only members of a selected social network or networks that include the user who captured it can view the media segment.

In some embodiments, public sharing of media segments (i.e., sharing via the server 106 of media segments that are marked for public sharing) can take place in a number of ways. First, if a user decides to follow a person, the user can see media segments from that person. For example, the server 106 can assembled all media segments from that person into a composite media program for viewing by the user. This allows the user to follow the selected person, and if media streams are uploaded in real-time, a user can follow the person in real-time. Second, public media segments can be tagged with a special category indicator that can later be used for forming combinations of media segments at the server 106. For instance, all media segments relating to a specific type of food can be marked with a special tag and then combined at the server, or all media segments related to poker can be tagged and combined. This allows users to following media segments that relate (i.e., tag) media segments to particular topics (food, poker, fishing, a child, etc. . . . ). Third, media segments can be assembled as public streams based on random sampling. In this embodiment, the server 106 can automatically combine media segments based on subject matter information associated with each media segment, where the media segments are combined only if the subject matter information associated with each is the same.

The method and system described above can also allow for comment posting by users. For example, if the viewer of a composite media program likes or is interested in certain media segments, the viewer can post comments about those media segments. This allows other viewers of the same media segments to see those comments. In addition, the capturing process can be set up so that each media segment captured by a given user within a predetermined time period (i.e., with the same 10 minutes or same hour) can be tagged as being associated with one another. When a viewer adds a comment for one of these media segments, each associated media segment can have the same comment added.

As set forth above, the invention can be a system or platform for capturing and combining media segments for viewing by users. The platform can include a series of services, modules, and application programming interfaces (APIs) that shape methods and elements for viewing. The media segments can be captured on mobile devices and shared via the Web to members of various social networks. This can allow users to dynamically capture and share media segments so that each segment is created and then aggregated so that it can be presented in an integrated manner. Media segments can be uploaded in real-time after being captured and then sorted by various variables (such as time, location, social networks, or tags) for assembly for viewing. This allows, for example, a user to view public media segments for persons visiting a specific restaurant (where the restaurant is identified by either geo location or by a tag). In addition, all media segments relating to home runs at a particular baseball stadium can be tagged so that the server 106 can compile a composite media segment relating to the home runs. The embodiments can allow for the creation of multiple channels for media curation.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

We claim:

1. A computerized method for creating a composite media program comprising:
 (a) receiving from a first user over a network at least a first media segment, wherein the first media segment includes a first plurality of media frames and a first set of information associated with the first media segment comprising time information, location information, subject matter information, and user information;
 (b) receiving from a second user over the network at least a second media segment, wherein the second media segment includes a second plurality of media frames and a second set of information associated with the second media segment comprising time information, location information, subject matter information, and user information; and
 (c) In response to a real-time request from a third user for viewing the composite media program that includes a series of media segments, automatically combining at least the first media segment and the second media segment in real-time into the composite media program wherein the composite media program is combined in an integrated way based on the first set of information and the second set of information, wherein the step of automatically combining includes automatically combining media segments based on time information from the first set of information associated with the first media segment and time information from the second set of information associated with the second media segment, wherein the first media segment and second media segment are combined only if a following set of criteria is satisfied: (i) the time information associated with each is generally the same, (ii) the location information associated with each is generally the same, (iii) the first user and second user are associated with a same social network, and (iv) the subject matter information associated with each is generally the same,
 (d) wherein the composite media program is available for viewing by a set of members of the same social network, the social network having privacy protections to allow users to keep information, including media segments, restricted to only certain users and not available to the public at large.

2. The computerized method of claim 1, wherein the composite media program is a video clip.

3. The computerized method of claim 1, further comprising transmitting the composite media program for viewing, wherein the composite media program is played back at a faster speed than a capture speed for the media frames.

4. The computerized method of claim 1, further comprising displaying comments added by viewers to the composite media program.

5. The computerized method of claim 1, further comprising:
 selecting and receiving at least a third media segment from the Internet, wherein the third media segment is related to at least one of the first set of information associated with the first media segment and the second set of information associated with the second media segment; and
 wherein the composite media program further includes the third media segment.

6. A non-transitory computer readable medium containing instructions that, when executed by a processor, performs the following steps to create a composite media program:

(a) receiving from a first user over a network at least a first media segment, wherein the first media segment includes a first plurality of media frames and a first set of information associated with the first media segment comprising time information, location information, subject matter information, and user information;

(b) receiving from a second user over the network at least a second media segment, wherein the second media segment includes a second plurality of media frames and a second set of information associated with the second media segment comprising time information, location information, subject matter information, and user information; and (c) In response to a real-time request from a third user for viewing the composite media program that includes a series of media segments, automatically combining at least the first media segment and the second media segment in real-time into the composite media program wherein the composite media program is combined in an integrated way based on the first set of information and the second set of information, wherein the step of automatically combining includes automatically combining media segments based on time information from the first set of information associated with the first media segment and time information from the second set of information associated with the second media segment, wherein the first media segment and second media segment are combined only if a following set of criteria is satisfied: (i) the time information associated with each is the generally same, (ii) the location information associated with each is generally the same, (iii) the first user and second user are associated with a same social network, and (iv) the subject matter information associated with each is generally the same, (d) wherein the composite media program is available for viewing by at least a set of members of the same social network, the social network having privacy protections to allow users to keep information, including media segments, restricted to only certain users and not available to the public at large.

* * * * *